(12) United States Patent
Ozawa et al.

(10) Patent No.: US 7,859,698 B2
(45) Date of Patent: Dec. 28, 2010

(54) FACSIMILE TRANSMISSION OVER A NETWORK

(75) Inventors: Takao Ozawa, Shiojiri (JP); Hidehiro Muneno, Tsukubamirai (JP)

(73) Assignee: Seiko Epson Corporation, Tokyo (JP)

( * ) Notice: Subject to any disclaimer, the term of this patent is extended or adjusted under 35 U.S.C. 154(b) by 909 days.

(21) Appl. No.: 11/644,292

(22) Filed: Dec. 21, 2006

(65) Prior Publication Data

US 2007/0291301 A1 Dec. 20, 2007

(30) Foreign Application Priority Data

Dec. 27, 2005 (JP) ............................. 2005-374932

(51) Int. Cl.
*G06F 3/12* (2006.01)
*H04N 1/32* (2006.01)

(52) U.S. Cl. ...................................... 358/1.15; 358/468

(58) Field of Classification Search ........ 358/1.13–1.15, 358/400, 401, 405, 407, 434, 435, 436, 437, 358/438; 379/100.01, 100.09
See application file for complete search history.

(56) References Cited

U.S. PATENT DOCUMENTS

| 5,832,190 | A | * | 11/1998 | Terajima et al. ............. 358/1.14 |
| 6,208,426 | B1 | | 3/2001 | Saito et al. |
| 2002/0033961 | A1 | | 3/2002 | Murphy |
| 2004/0083260 | A1 | | 4/2004 | Kobayashi et al. |
| 2005/0134903 | A1 | * | 6/2005 | Tanimoto et al. ............ 358/1.15 |
| 2007/0146804 | A1 | * | 6/2007 | Mehta et al. ................. 358/405 |
| 2008/0123124 | A1 | * | 5/2008 | Smithson ..................... 358/1.13 |

FOREIGN PATENT DOCUMENTS

| EP | 0 886 432 | 12/1998 |
| EP | 1 304 863 | 4/2003 |
| JP | 2001-28679 | 1/2001 |
| JP | 2003-309701 | 10/2003 |
| JP | 2004-147244 | 5/2004 |
| KR | 1998-066007 | 10/1998 |

OTHER PUBLICATIONS

Partial European Search Report issued Jul. 12, 2007 for European Application No. 06256542.9.

* cited by examiner

*Primary Examiner*—Jerome Grant, II
(74) *Attorney, Agent, or Firm*—Nutter McClennen & Fish LLP; John J. Penny, V; Christina M. Sperry

(57) ABSTRACT

A technology to facilitate realization of facsimile transmission of an image over a network is provided. A facsimile device includes an image data storage unit to store received image and an output device connection unit that connects the facsimile device to an image output device. The output device connection unit can switch the logical connection to the image output device between a connected state and a disconnected state. File management of the image data storage unit is performed by the image output device during the logical connection is in the connected state. The facsimile device receives the image data in the disconnected state, switches the logical connection to the connected state after the reception of the image data, transfers the image data stored in the image data storage unit to the image output device, and switches the logical connection to the disconnected state after the image data is transferred.

14 Claims, 10 Drawing Sheets

FACSIMILE TRANSMISSION OVER A NETWORK

CROSS-REFERENCE TO RELATED APPLICATIONS

The present application claims the priority based on Japanese Patent Application No. 2005-374932 filed on Dec. 27, 2005, the disclosure of which is hereby incorporated herein by reference in its entirety.

BACKGROUND OF THE INVENTION

1. Field of the Invention

This invention relates to a technique for executing facsimile transmission over a network.

2. Description of the Related Art

Facsimile transmission entails conversion of an image obtained by a sending-side terminal into audio signals and the transmission thereof to a receiving-side terminal over an audio transmission line. In recent years, besides the conventional telephone wire network, a telephone network using the Internet called "IP telephone network" has come to be used as this audio transmission line. For example, JP2003-309701A discloses a facsimile transmission apparatus that executes facsimile transmission over a network achieved with transmission of audio signals over an IP telephone network. In this Specification, "facsimile transmission" refers to the transmission of an image, while "facsimile transmission apparatus" or "facsimile apparatus" refers generally to any apparatus that carries out image transmission.

Where facsimile transmission is to be performed, the various processes executed by the sender or receiver of the facsimile transmission, such as image input/output, and call control, must be performed in a prescribed sequence. Consequently, in the facsimile transmission apparatus, an image input/output unit and a facsimile sending/receiving unit are controlled by a single controller.

However, where the image input/output unit and the facsimile sending/receiving unit are controlled by a single controller, the control operation of the controller become complex to simultaneously control the operations of the image input/output unit and the facsimile sending/receiving unit. Furthermore, in a scanner/printer/copier multifunction peripheral (termed generally an "MFP"), facsimile transmission may be impossible, or the MFP may require remodeling to provide a facsimile transmission function.

SUMMARY OF THE INVENTION

An object of the present invention is to provide a technology that facilitate realization of facsimile transmission of an image over a network.

According to an aspect of the present invention, a facsimile device for receiving an image over a network is provided. The facsimile device includes: an image data storage unit configured to store image data representing an image received over the network; and an output device connection unit configured to control logical connection of the facsimile device to an external image output device for outputting the image according to the image data supplied from the facsimile device, wherein the output device connection unit is configured to be able to switch the logical connection to the image output device between a connected state and a disconnected state, during the logical connection between the facsimile device and the image output device is in the connected state, file management of the image data storage unit in the facsimile device is performed by the image output device, and the facsimile device is configured: to receive an image data over the network when the logical connection is in the disconnected state; to switch the logical connection to the connected state after the image data is received; to transfer the image data stored in the image data storage unit to the image output device under control of the image output device the logical connection to which is in the connected state; and to switch the logical connection to the disconnected state after the image data is transferred.

During the file management of an image data storage unit in a facsimile device is performed by an image output device, the facsimile device cannot store received image data in the image data storage unit. On the other hand, the facsimile device of the present invention stops the image output device from carrying out file management by switching the logical connection between the facsimile device and the image output device to the disconnected state after the image data is transmitted to the image output device. Because of this, the facsimile device may receive image data in the disconnected state during which the image data can be stored in the image data storage unit by the facsimile device. Therefore the facsimile device may execute the facsimile reception by storing the received image data and by supplying the stored image data to the image output device.

According to another aspect of the present invention, there is provided a facsimile device for transmitting an image over a network including: a sending instruction obtaining unit configured to obtain from a user a sending instruction of sending the image by the facsimile device; an image data storage unit configured to store image data representing the image; an image data sending unit configured to send the image data stored in the image data storage unit over the network; and an input device connection unit configured to control logical connection of the facsimile device to an external image input device for providing image data to the facsimile device, wherein the input device connection unit is configured to be able to switch the logical connection to the image input device between a connected state and a disconnected state, during the logical connection between the facsimile device and the image input device is in the connected state, file management of the image data storage unit in the facsimile device is performed by the image input device, and the facsimile device is configured: to switch the logical connection to the connected state after the sending instruction is obtained by the sending instruction obtaining unit; to store an image data transferred from the image input device to the image data storage unit under control of the image input device the logical connection to which is in the connected state; to switch the logical connection to the disconnected state after the image data is transferred over the network; and to delete the image data stored in the image data storage unit after the logical connection is switched to the disconnected state.

According to this configuration, after the logical connection between the facsimile device and the image input device is switched to the disconnected state, the image data in the image data storage unit is deleted by the facsimile device. Because the file management of the image data storage unit is not performed by the image input device during the logical connection is in the disconnected state, the likelihood may be reduced that the deletion of image data by the facsimile device interferes the file management performed by the image input device.

According to yet another aspect of the present invention, a facsimile device for transmitting an image over a network is provided. The facsimile device includes an image data storage unit configured to store image data representing an image; an input/output device connection unit configured to control logical connection of the facsimile device to an external image input/output device for providing image data to the facsimile device and for outputting the image according to the image data supplied from the facsimile device; a facsimile sending unit configured to execute facsimile sending of the image; a facsimile receiving unit configured to execute a facsimile reception of the image; and a sending instruction obtaining unit configured to obtain from a user a sending instruction of sending the image by the facsimile sending unit, wherein the input/output device connection unit is configured to be able to switch the logical connection to the image input/output device between a connected state and a disconnected state, the facsimile sending unit has an image data sending unit configured to send the image data stored in the image data storage unit over the network, the facsimile sending unit is configured: to connect the facsimile device to the input/output device as a mass storage device by switching the logical connection to the connected state after the sending instruction is obtained by the instruction obtaining unit; to store an image data transferred from the image input/output device into the image data storage unit under control of the image input/output device the logical connection to which is in the connected state; and to switch the logical connection to the disconnected state after the image data is transferred from the image input/output device, the facsimile receiving unit has an image data receiving unit configured to store an image data received over the network into the image data storage unit, and the facsimile receiving unit is configured: to connect the facsimile device to the input/output device as a still image capturing device by switching the logical connection to the connected state after commencement of receiving the image data over the network; to transfer the image data stored in the image data storage unit to the image input/output device under control of the image input/output device the logical connection to which is in the connected state; and to switch the logical connection to the disconnected state after the image data is transferred to the image input/output device.

During logical connection between a facsimile device and an image input/output device is maintained in connected state, the type of device recognized by the image input/output device cannot be changed. On the other hand the facsimile device of the present invention is configured to switch the logical connection between a connected state and a disconnected state whereby the facsimile device the facsimile device can be connected to the image input/output device as different types of devices, i.e., as a mass storage device during facsimile sending and as a still image capturing device during facsimile reception.

The present invention can be implemented in various forms, such as in the forms of, for example, a facsimile transmission system and facsimile transmission method, a facsimile terminal device and control method thereof used in these transmission system and method, a computer program that executes one or more of the functions of the above transmission system, transmission method, and terminal device and control method, a recording medium on which such computer program is recorded, or a data signal encoded in a carrier wave that includes such computer program.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will be described below in the following sequence based on examples.

A. First Embodiment

B. Second Embodiment

C. Variations

A. First Embodiment

Figure 1:
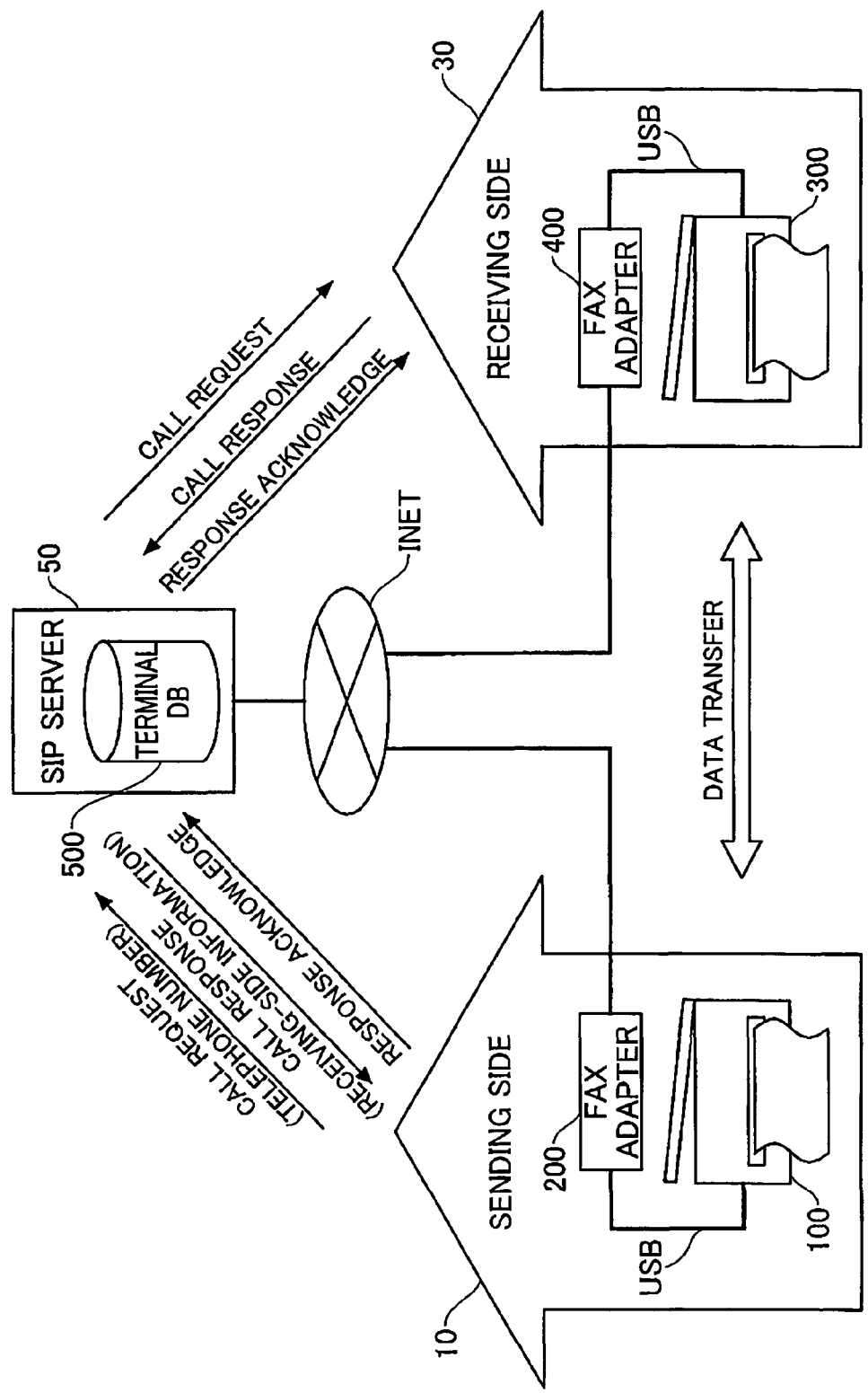
FIG. 1 is an explanatory drawing showing the configuration of the facsimile transmission system as a first embodiment.

FIG. 1 is an explanatory drawing showing the configuration of the facsimile transmission system as the first embodiment. In this facsimile transmission system, a sending-side network system 10 is connected to a receiving-side network system 30 over the Internet INET.

The sending-side network system 10 has a scanner/printer/copier multifunction peripheral 100 (hereinafter also called "MFP 100") and a network facsimile adapter (FAX adapter) 200. The MFP 100 is connected to the FAX adapter 200 via Universal Serial Bus (USB). The FAX adapter 200 is connected to the Internet INET. The FAX adapter 200 may also be connected to the Internet INET via a router.

Similar to the sending-side network system 10, the receiving-side network system 30 has an MFP 300 and a FAX adapter 400, which are interconnected via USB, and the FAX adapter 400 is connected to the Internet INET directly.

The facsimile transmission system of the first embodiment is realized through the use of an Internet-based telephone network (IP telephone network). This IP telephone network is achieved by transmission of the audio data with peer-to-peer (P2P) communication using the Internet. Here, peer-to-peer communication refers to a communication method to transfer data from a sending-side network device to a receiving-side network device without traveling through any specific server. In the first embodiment, the IP telephone network system according to the Session Initiation Protocol (SIP) is used as an IP telephone network system that uses the peer-to-peer communication. Hereinafter, such an IP telephone network system is simply termed "SIP system".

In a SIP system, as shown in FIG. 1, a SIP server 50 is connected to the Internet INET. The SIP server 50 has a terminal database 500 in which information pertaining to the terminals of the IP telephone network is stored. Specifically, information such as terminal IP addresses and supported functions is stored in this terminal database in associated with identifiers that specify each terminal. A SIP URI comprising an identifier based on the Uniform Resource Identifier (URI) format, which includes a text string indicating the telephone number of the terminal, is normally used as the identifier to specify each terminal. Since each terminal notifies information on each terminal to the SIP server 50, the information to be stored in the terminal database 500 is registered.

For carrying out SIP-system based communication, the user inputs the telephone number of the recipient (receiving-side) into the sending-side terminal. The input telephone number is converted into a SIP URI by the sending-side terminal. The sending-side terminal then sends a call request message that includes the SIP URI to the SIP server 50. The SIP server 50 obtains the IP address of the receiving-side terminal by referring to the terminal database 500 with the SIP URI in the call request message. The SIP server 50 then forwards the call request message to the receiving-side terminal specified in the obtained IP address.

When the receiving-side terminal that has received the call request message answers the call from the sending-side terminal, the receiving-side terminal sends a call response message to the SIP server 50. The SIP server 50 forwards the call response message sent from the receiving-side terminal to the sending-side terminal. Connection information necessary to establish communication over the Internet, such as the IP address and TCP/IP port of the receiving-side terminal, is stored in this call response message.

When the sending-side terminal has received the call response message, the sending-side terminal sends a response acknowledge message to the SIP server 50. The SIP server 50 forwards the response acknowledge message to the receiving-side terminal. When the receiving-side terminal receives the forwarded response acknowledge message, a peer-to-peer communication path is established between the sending-side terminal and the receiving-side terminal, enabling data to be transferred between the sending-side terminal and the receiving-side terminal. In this Specification, the establishment of this peer-to-peer communication path by the SIP system is also termed "SIP session initiation." Disconnection of this peer-to-peer communication path is also termed "SIP session termination."

Both of the two FAX adapters 200, 400 of the first embodiment function as SIP system terminals. As a result, the sending-side FAX adapter 200 initiates an SIP session by sending a call request message that includes a telephone number to the SIP server 50, and obtaining connection information regarding the receiving-side FAX adapter 400 (hereinafter termed "receiving-side information") included in the call response message forwarded from the SIP server 50. Image data can be sent by transferring data through the established peer-to-peer communication path as described below.

In the example of FIG. 1, the receiving-side terminal is a facsimile adapter, but where the receiving-side terminal is not a facsimile adapter, a session to execute facsimile transmission is not initiated. In a typical SIP system, when a SIP session is initiated, communication method, such as the encoding/decoding method (generally termed "CODEC") and data transfer protocol, usable between the sending-side terminal and receiving-side terminal is determined (the process of determination is termed "media negotiation"). Consequently, whether or not the receiving-side terminal is a facsimile adapter can be determined by determining through this media negotiation whether or not a communication method for executing facsimile transmission can be used.

Figure 2:
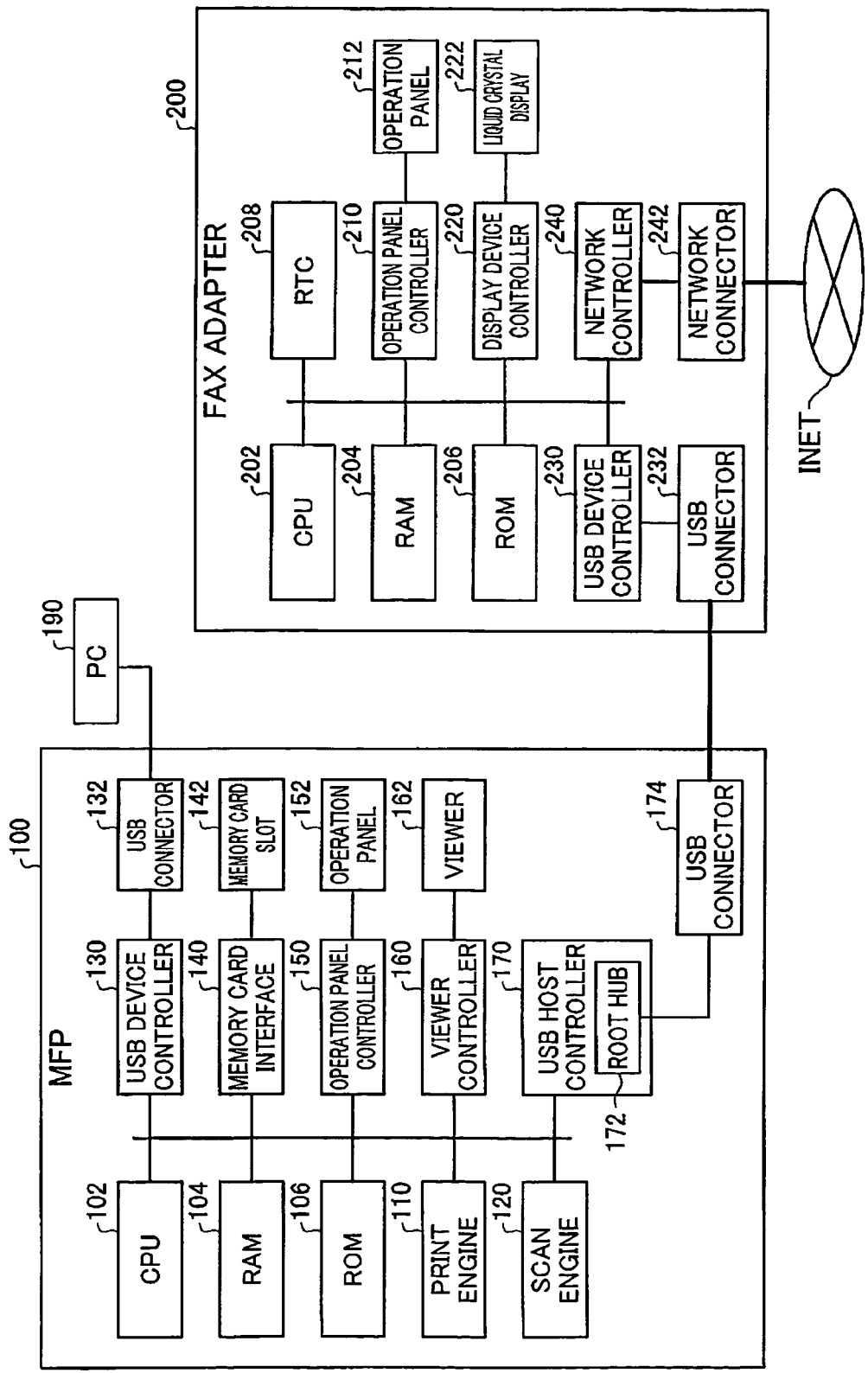
FIG. 2 is a block diagram showing the configuration of the sending-side network system 10.

FIG. 2 is a block diagram showing the configuration of the sending-side network system 10. Because the configuration of the receiving-side network system 30 (FIG. 1) is similar to that of the sending-side network system 10, it will not be described herein.

The MFP 100 has a central processing unit (CPU) 102, a RAM 104, a ROM 106, a print engine 110, a scan engine 120, a USB device controller 130, a USB host controller 170, a memory card interface 140, an operation panel controller 150 and a viewer controller 160. The control software for the MFP 100 is stored in the ROM 106. The central processing unit 102 realizes various functions possessed by the MFP 100 by executing the control software stored in the ROM 106.

The USB device controller 130 of the MFP 100 is connected to a USB connector 132. A personal computer (PC) 190 is connected to this USB connector 132. A desired USB host may be connected to the USB connector 132 in lieu of the personal computer 190. The USB host controller 170 has a root hub 172, and a USB connector 174 is connected to this root hub 172. A USB device such as a digital camera or hard disk drive (HDD) can be connected to this connector 174.

The memory card interface 140 is connected to a memory card slot 142. An operation panel 152 that serves as input means is connected to the operation panel controller 150. A viewer 162 that serves as image display means is connected to the viewer controller 160. The user can input various instructions using this operation panel 152 while viewing an image or a menu displayed on the viewer 162.

The print engine 110 is a printing mechanism that executes printing according to supplied print data. The print data supplied to the print engine 110 is generated by the CPU 102's interpretation of received data supplied from an external personal computer 190 connected via the USB connector 132 and subsequent execution of color conversion and/or halftone processing to such data. The print data supplied to the print engine 110 may be generated from image data stored in a memory card inserted in the memory card slot 142 or from image data supplied from a digital still camera connected via the USB connector 174. Alternatively, a configuration may be adopted in which the print engine 110 has the color conversion function and the halftone processing function rather than the CPU 102. In this Specification, the execution of printing using print data generated from image data is called "image data printing".

The scan engine 120 is mechanism that scans an image and generates scan data expressing the image. The scan data generated by the scan engine 120 is converted by the CPU 102 into image data (scan image data) having a prescribed format (such as the JPEG format, for example). The scan image data is forwarded to the personal computer 190. The scan image data may be stored on a memory card inserted in the memory card slot 142 or a device connected via the USB connector 174. Alternatively, a configuration may be adopted in which the scan engine 120, rather than the CPU 102, has the function to generate image data from scan data.

The FAX adapter 200 includes a CPU 202, a RAM 204, a ROM 206, a real-time clock (RTC) 208, an operation panel controller 210, a display device controller 220, a USB device controller 230 and a network controller 240. The control software for the FAX adapter 200 is stored in the ROM 206.

The CPU 202 realizes various functions possessed by the FAX adapter 200 by executing the control software stored in the ROM 206.

The real-time clock 208 has a clock function that stores the current time. The CPU 202 generates a log that includes the time of execution of various processes executed by the FAX adapter 200 and the detail of the processes by accessing this real-time clock 208 and obtaining the current time. The CPU 202 stores the generated log in a non-volatile RAM (not shown) such as a flash memory.

An operation panel 212 that serves as input means is connected to the operation panel controller 210. A liquid crystal display device 222 that serves as display means to display the status of the FAX adapter 200 and the various information input from the operation panel 212 is connected to the display device controller 220. The user can input various instructions using the operation panel 212 while viewing the display on the liquid crystal display device 222.

The USB device controller 230 of the FAX adapter 200 is connected to a USB connector 232. The FAX adapter 200 is connected to the USB host controller 170 of the MFP 100 via this USB connector 232 and the USB connector 174 of the MFP 100. A network connector 242 is connected to the network controller 240. The FAX adapter 200 is connected to the Internet INET via this network connector 242.

Figure 3:
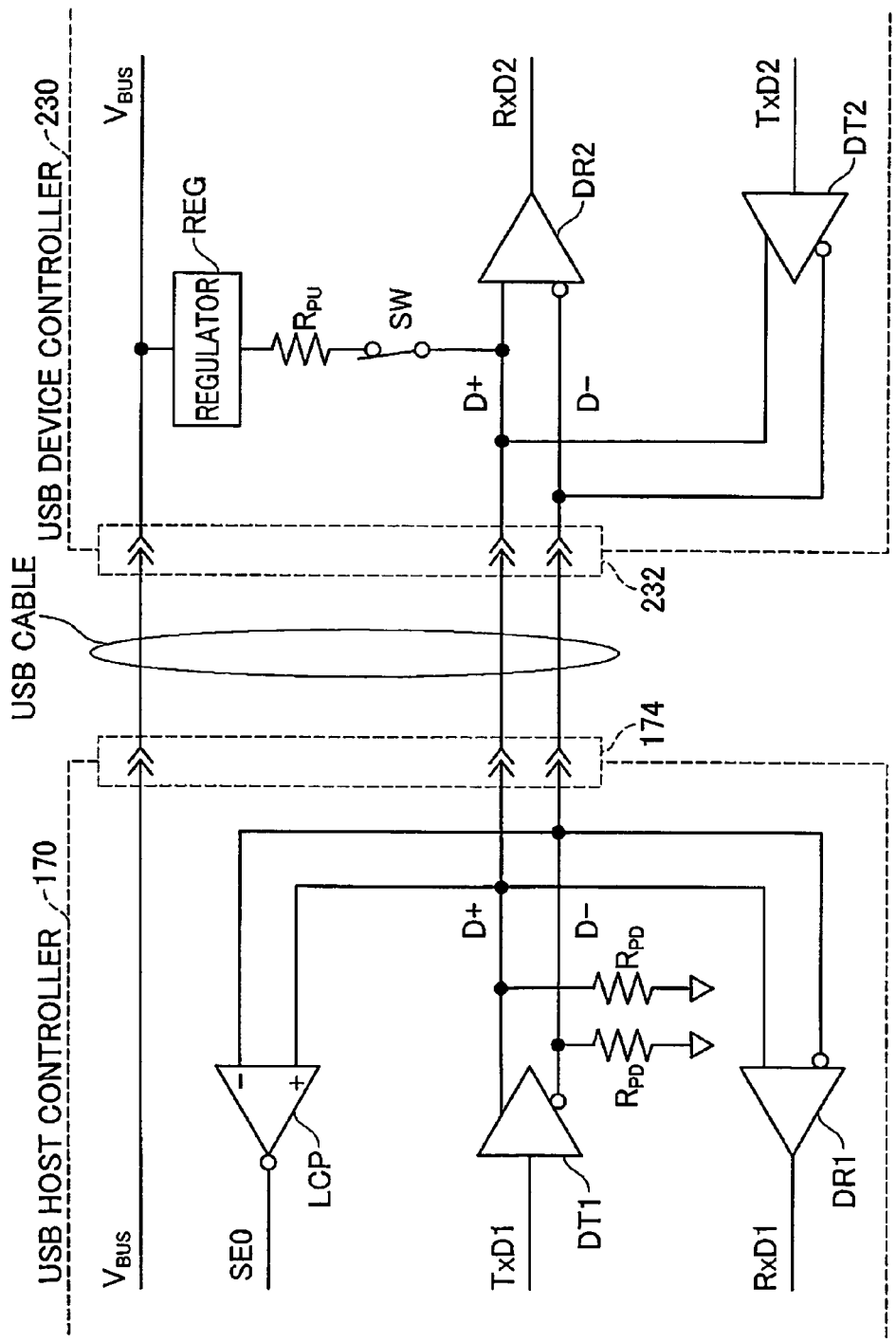
FIG. 3 is a circuit schematic showing the connecting circuit that connects the USB host controller 170 of the MFP 100 and the USB host controller 230 of the FAX adapter 200.

FIG. 3 is a circuit schematic showing the connecting circuit that connects the USB host controller 170 of the MFP 100 (FIG. 2) and the USB host controller 230 of the FAX adapter 200 (FIG. 2). In USB, a host and a device are connected with a USB cable having a total of four lines, i.e., two signal lines that carry differential signals D+, D− used to transfer data, a power line that supplies bus voltage $V_{BUS}$ from the host to the device, and a ground line (not shown). In the discussion below, the signal line that carries the signal D+ is termed the "signal line D+". Similarly, the signal line that carries the signal D− is termed the "signal line D−" and the power line that supplies the bus voltage $V_{BUS}$ is termed the "power line $V_{BUS}$."

The USB host controller 170 includes a differential transmitter DT1, a differential receiver DR1 and a comparator LCP. The differential transmitter DT1 converts the transmission signal TxD1 into the differential signals D+, D−, and supplies each differential signal to respective signal line. The differential receiver DR1 converts the differential signals D+, D− supplied from the signal lines into a received signal RxD1. The comparator LCP outputs a signal SE0 that indicates whether or not the voltage of the signal line D+ relative to the signal line D− is equal to or less than a prescribed threshold value. If the value of the signal SE0 is "true" (termed the "SE0 state" below), this indicates that the voltage of the signal line D+ relative to the signal line D− is equal to or less than the prescribed threshold value. In the USB host controller 170, the two signal lines D+, D− are respectively grounded by a pull-down resistor $R_{PD}$.

The USB device controller 230 includes a differential transmitter DT2, a differential receiver DR2, and a regulator REG. The differential transmitter DT2 converts the transmission signal TxD2 into the differential signals D+, D−, and supplies each differential signal to respective signal line. The differential receiver DR2 converts the differential signals D+, D− supplied from the signal lines into a received signal RxD2. The regulator REG is a voltage regulator circuit that reduces the bus voltage $V_{BUS}$ supplied from the USB host controller 170 via the power line $V_{BUS}$ to a prescribed voltage. In the USB device controller 230, the signal line D+ is connected to the regulator REG via a switch SW and a pull-up resistor $R_{PU}$.

According to the USB standard, it is determined whether or not the USB host controller 170 is connected to the USB device controller 230 with a USB cable by determining the state of the SE0 signal described above. Specifically, where a USB cable is connected, the signal lines D+, D− of the USB host controller 170 are grounded by the pull-down resistors $R_{PD}$. Consequently, the voltage between these signal lines D+, D− when the differential signals D+, D− are not being transmitted becomes roughly 0, which is the SE0 state, and it is accordingly determined that there is no USB cable connection. If a USB cable is connected, on the other hand, because the signal line D+ is connected to the regulator REG via the switch SW in the connected state (closed state) and the pull-up resistor $R_{PU}$, the voltage between the signal lines D+, D− becomes a value other than '0' (i.e. the SE1 state), and it is determined that a USB cable connection exists.

Here, when the switch SW is shifted to the disconnected state (i.e., the open state), the signal line D+ and the pull-up resistor $R_{PU}$ are disconnected. As a result, the voltage between the signal lines D+, D− becomes identical to that in the SE0 state in which there is no cable connection, even if the USB host controller 170 is connected by a USB cable to the USB device controller 230. By opening and closing the switch SW in this way, in the state in which the USB host controller 170 is physically connected to the USB device controller 230 by a USB cable, the logical connection between the USB host controller 170 and the USB device controller 230 can be switched between the connected state (the SE1 state) and the disconnected state (the SE0 state). In the discussion below, unless otherwise specified, a USB connection is deemed to indicate a logical connection.

Figure 4:
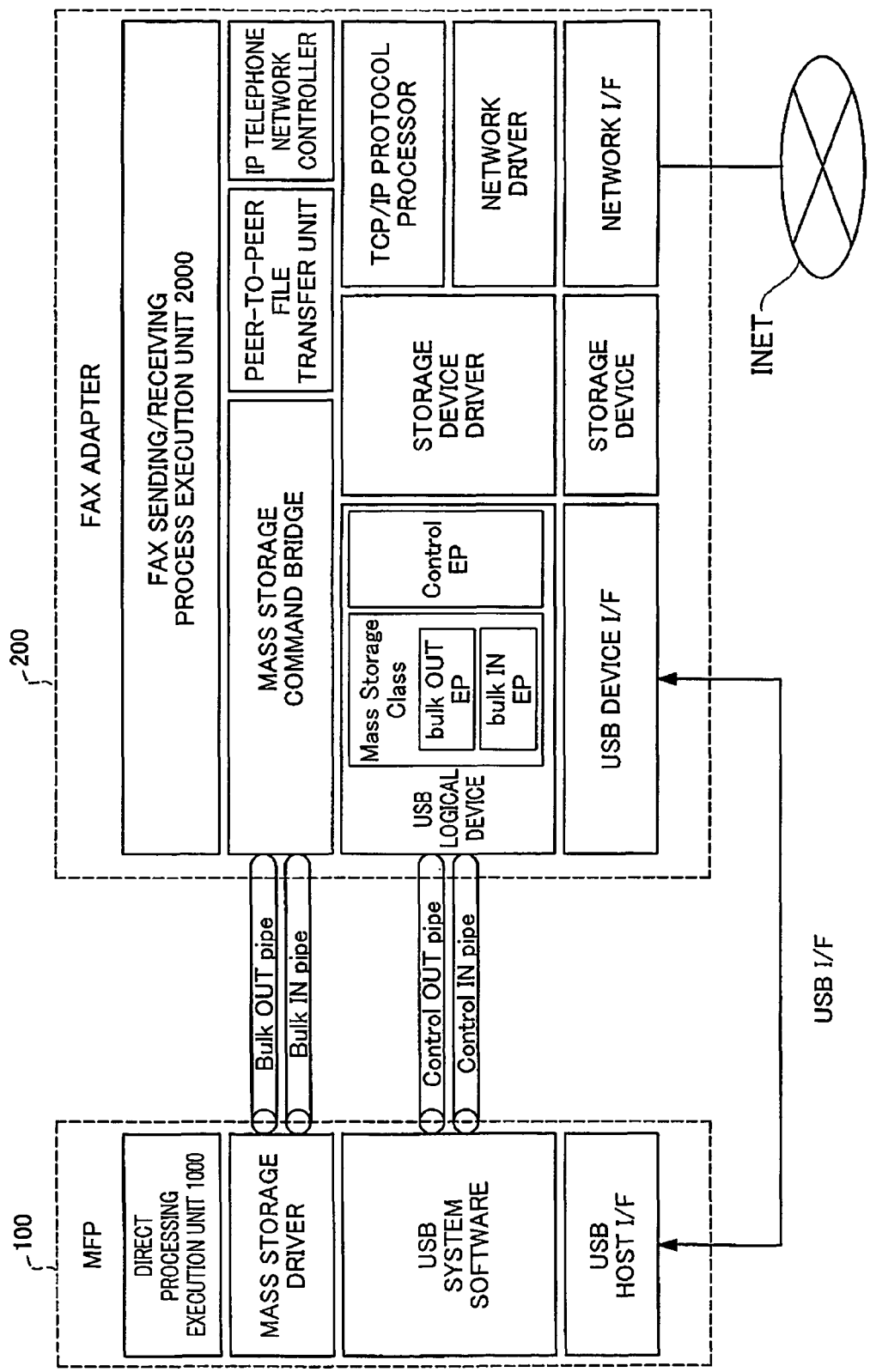
FIG. 4 is a block diagram showing the hierarchical configuration of the functions related to facsimile transmission.

FIG. 4 is a block diagram showing the hierarchical configuration of the functions related to facsimile transmission. The MFP 100 includes a direct processing execution unit 1000 in the topmost level, and the FAX adapter 200 includes a FAX sending/receiving process execution unit 2000 in the topmost level.

The MFP 100 includes in the level below the direct processing execution unit 1000, in sequential order from the top, a mass storage driver, USB system software and a USB host interface (I/F).

The FAX adapter 200 includes a mass storage command bridge, a USB logical device and a USB device interface below the FAX sending/receiving process execution unit 2000 as USB-related functions. The FAX adapter 200 also includes a peer-to-peer file transfer unit, an IP telephone network controller, a TCP/IP protocol processor, a network driver and a network interface as SIP system-related functions.

The FAX adapter 200 includes a storage device driver and a storage device as functions related to both USB and SIP. The storage device is a virtual memory device. A partial area of the RAM 204 which is incorporated in the FAX adapter 200 (FIG. 2) is used as the storage device. A storage device may also be disposed in the FAX adapter 200 besides the RAM 204.

Communication between the MFP 100 and the FAX adapter 200 is implemented via various communication channels between the MFP 100 and the FAX adapter 200. These communication channels indicate the logical communication paths between corresponding levels of the MFP 100 and the FAX adapter 200.

The direct processing execution unit 1000 of the MFP 100 controls the storage device driver of the FAX adapter 200 as well as lower-level storage devices via these communication channels. Various functions possessed by the direct processing execution unit 1000 are implemented by managing the storage device files. Specifically, the three functions described below are implemented by the direct processing execution unit 1000:

(1) A function to generate image data using the scan engine 120 (FIG. 2) and write the generated image data to the storage device provided by the FAX adapter 200;

(2) A function to write image data which is stored on a memory card inserted in the memory card slot 142 (FIG. 2) to the storage device provided by the FAX adapter 200; and (3) A function to read image data from the storage device provided by the FAX adapter 200 and print the read image data with the print engine 110 (FIG. 2).

The IP telephone network controller of the FAX adapter 200 initiates an SIP session in the SIP system described above. The IP telephone network controller also terminates an SIP session. The peer-to-peer file transfer unit reads image data from the storage device and sends the image data with the peer-to-peer communication path established by the SIP session initiation. The peer-to-peer file transfer unit also stores received image data in the storage device. Consequently, the storage device may also be called an "image data storage unit."

Figure 5:
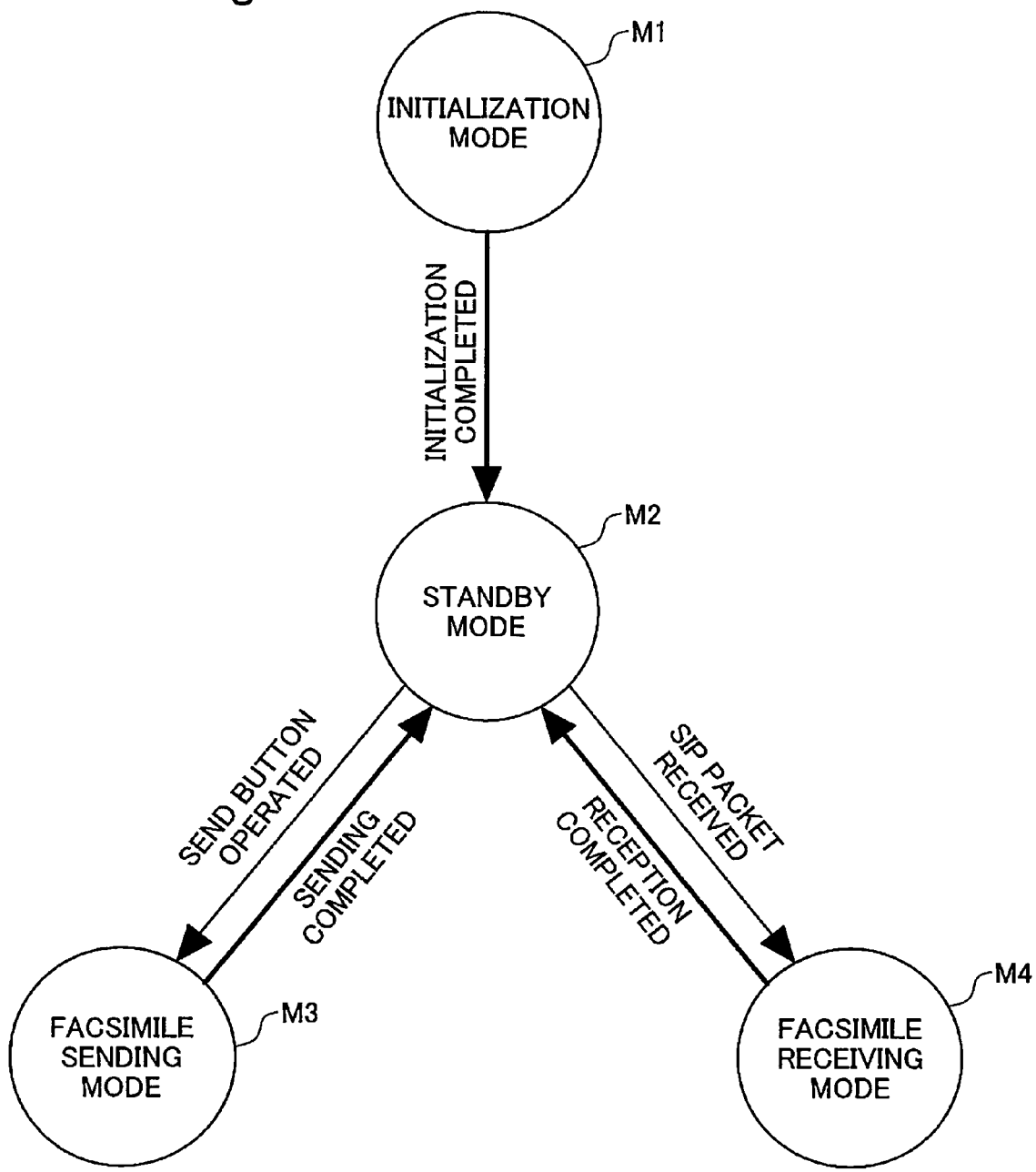
FIG. 5 is a state transition diagram showing the transition of the operating mode in the FAX adapter 200.

FIG. 5 is a state transition diagram showing the transition of the operating mode in the FAX adapter 200. The FAX adapter 200 has four modes, i.e., an initialization mode M1, a standby mode M2, a facsimile sending mode M3 and a facsimile receiving mode M4. The bold arrows in FIG. 5 indicate the sequence of automatic state transition occurred by the FAX adapter 200 itself, while the fine arrows indicate the sequence of transition due to a trigger externally supplied to the FAX adapter 200.

The initialization mode M1 is a state in which the FAX adapter 200 executes initialization processing. This initialization mode M1 is the first operation mode that becomes active when the FAX adapter 200 is physically connected to the MFP 100 via USB and the power to the connected MFP 100 is turned on. Here, the FAX adapter 200 performs such required initialization processes as the issuance to the SIP server 50 (FIG. 1) of information regarding the FAX adapter 200. When initialization processing is completed, the operation mode of the FAX adapter 200 transits to the standby mode M2.

The turning on of power to the connected MFP 100 can be detected by monitoring the USB bus voltage $V_{BUS}$ (FIG. 3). Moreover, the FAX adapter 200 is configured as a bus-powered device in which the bus voltage $V_{BUS}$ is used as the power source, the initialization mode M1 is an operation mode in which the initialization executed when the power to the FAX adapter 200 is turned on. Generally, such a initialization is called "power-on reset."

In the first embodiment, in the initialization mode M1 of FIG. 5, the switch SW of the USB device controller 230 (FIG. 3) is maintained in the open state. As a result, the MFP 100 recognizes that the FAX adapter 200 is not connected while the FAX adapter 200 is in the initialization mode M1.

The standby mode M2 is a state in which the FAX adapter 200 waits for an externally-supplied trigger. In this standby mode M2, the issuance to the SIP server of information pertaining to the FAX adapter 200 and the updating of the display on the liquid crystal display device 222 (FIG. 2) are performed when necessary.

If the user presses the send button on the operation panel 212 (FIG. 2) during the FAX adapter is in the standby mode M2, the operation mode of the FAX adapter 200 transits to the facsimile sending mode M3. When facsimile sending is completed, the operation mode of the FAX adapter 200 returns to the standby mode M2.

If the FAX adapter 200 receives a specific type packet from the SIP server 50 during the FAX adapter is in the standby mode M2, the operation mode of the FAX adapter 200 transits to the facsimile receiving mode M4. When facsimile reception is completed, the operation mode of the FAX adapter 200 returns to the standby mode M2. The specific type packet that causes the FAX adapter 200 to transit from the standby mode M2 to the facsimile receiving mode M4 is a packet sent by the SIP server 50 when a SIP session is initiated. The packet used as this triggering packet may be a packet that forwards a call request message or a packet that forwards a response acknowledge.

Figure 6:
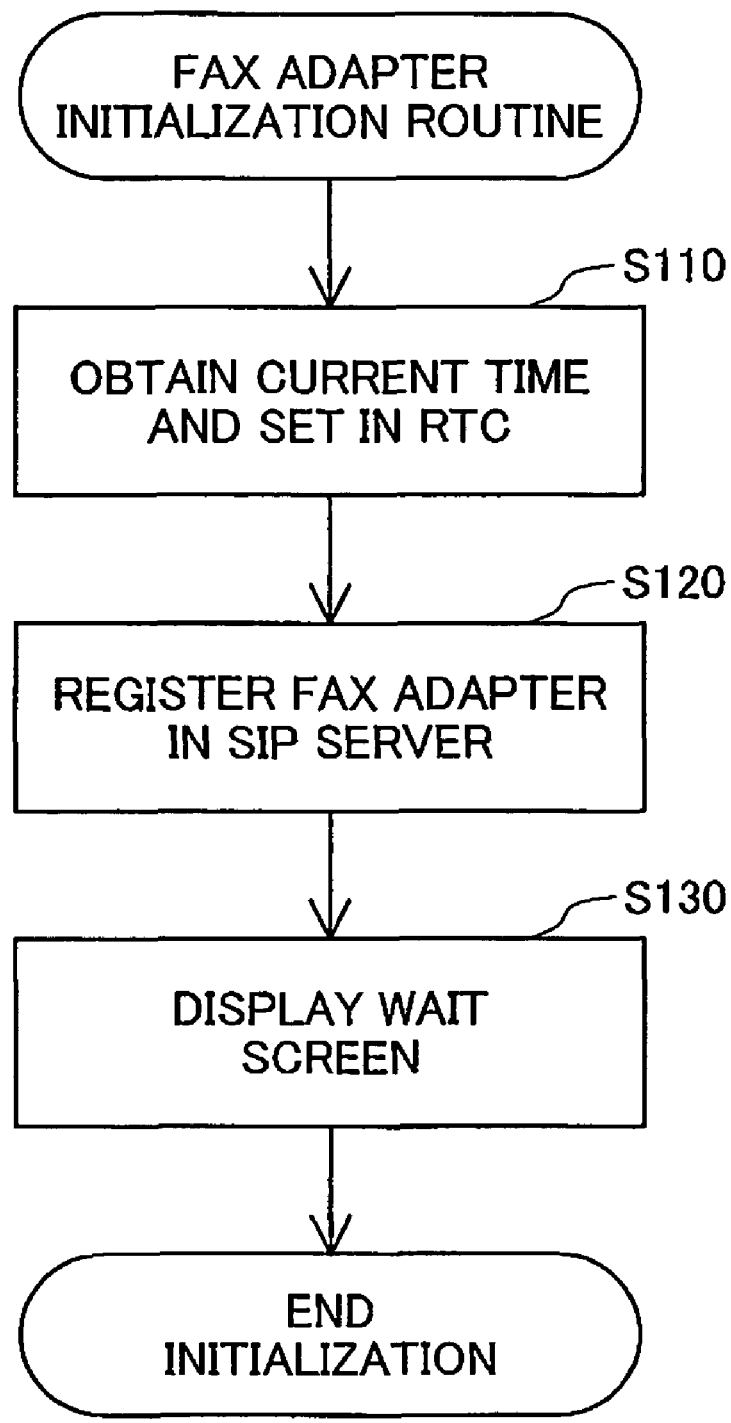
FIG. 6 is a flow chart showing the initialization routine executed by the FAX adapter 200 in the initialization mode M1.

FIG. 6 is a flow chart showing the initialization routine executed by the FAX adapter 200 in the initialization mode M1 (FIG. 5). This initialization routine is executed where the power to the MFP 100 connected to the FAX adapter 200 is turned on as described above.

In step S110, the facsimile sending/receiving process execution unit 2000 (see FIG. 4) accesses an NTP (Network Time Protocol) server (not shown) which is connected to the Internet INET. The obtained current time is then set in the real-time clock 208. This step S110 may be omitted. However, where the FAX adapter 200 is configured as a bus-powered device, it is preferred that the current time is set in the real-time clock 208 during the initialization routine, because the backup power supply for operating the real-time clock 208 during the power is not supplied from the MFP 100 may be omitted.

In step S120, the facsimile sending/receiving process execution unit 2000 registers the FAX adapter 200 in the SIP server 50 (FIG. 1) connected to the Internet INET. Specifically, the FAX adapter 200 registers the FAX adapter 200 in the terminal database 500 of the SIP server 50 by notifying to the SIP server 50 the connection information that identifies the FAX adapter 200, such as the SIP URI or IP address, or information indicating the state of the FAX adapter 200.

In step S130, the facsimile sending/receiving process execution unit 2000 displays a wait screen on the liquid crystal display 222 (FIG. 2). After the wait screen is displayed, the initialization routine of FIG. 6 terminates. The operation mode of the FAX adapter 200 transits from the initialization mode M1 (FIG. 5) to the standby mode M2 (FIG. 5) by the termination of this initialization routine.

Figure 7:
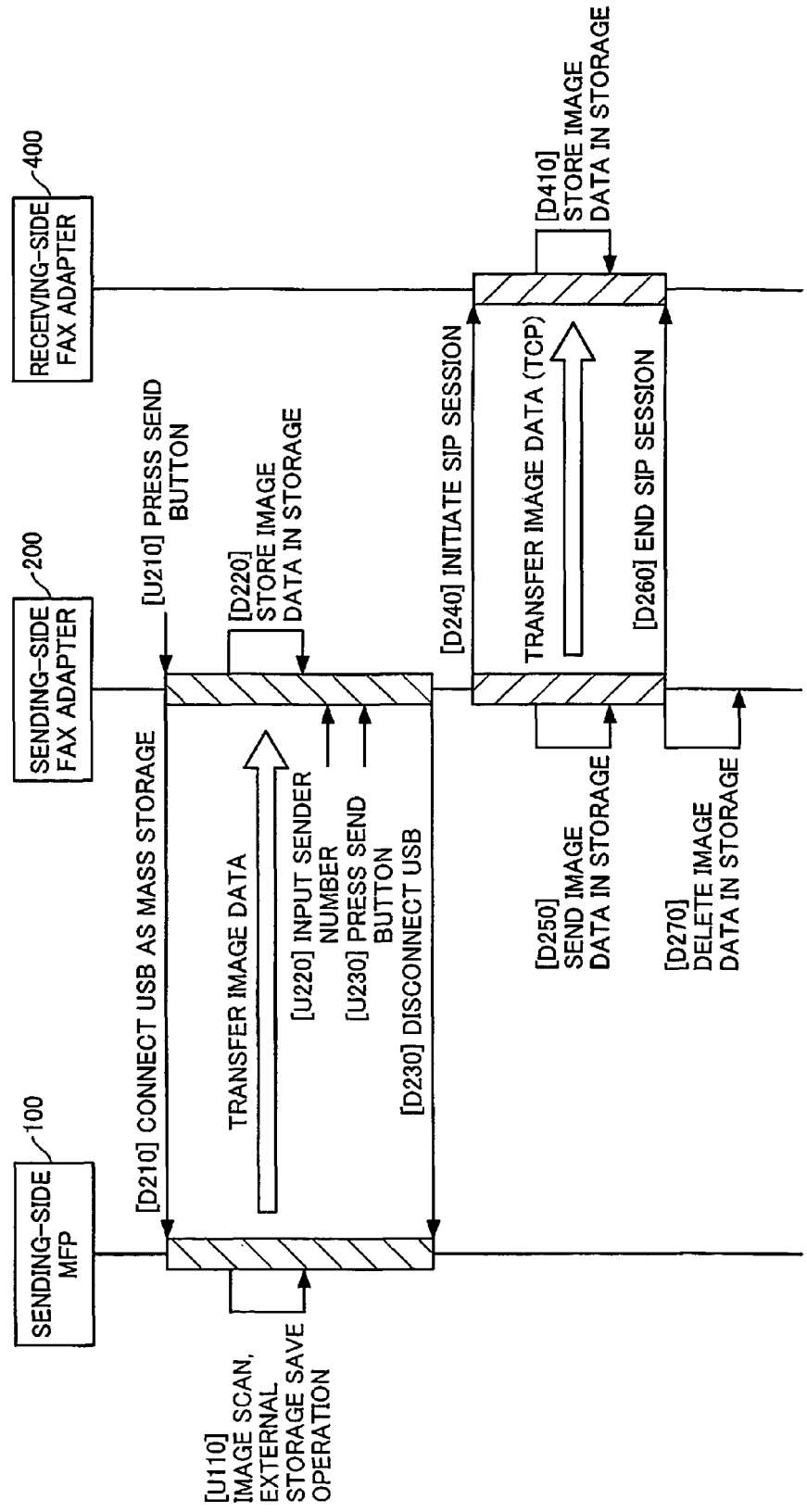
FIG. 7 is a sequence diagram showing the facsimile sending sequence in the facsimile sending mode M3.

FIG. 7 is a sequence diagram showing the facsimile sending sequence in the facsimile sending mode M3 (FIG. 5). The sequence diagram of FIG. 7 shows the case where facsimile sending is performed by the sending-side MFP 100 and the sending-side FAX adapter 200 to the receiving-side FAX adapter 400.

If the user presses the send button of the operation panel 212 (FIG. 2) in step [U210], the sending-side FAX adapter 200 connects the sending-side FAX adapter 200 to the MFP 100 as a mass storage device in step [D210]. Specifically, the facsimile sending/receiving process execution unit 2000 switches the switch SW that was being maintained in the open state in the initialization mode (FIG. 5) to the closed state. When the switch SW enters the closed state, the MFP 100 recognizes that the sending-side FAX adapter 200 has been connected.

After the sending-side FAX adapter 200 has been connected as a mass storage device in step [D210], the user performs operations in step [U110] to scan an image with the MFP 100 and to save the image data in an external storage device. Here, since the sending-side FAX adapter 200 is connected to the MFP 100 as a mass storage device, the image data is transferred to the sending-side FAX adapter 200. In step [D220], the image data transferred from the MFP 100 is stored in the storage device of the sending-side FAX adapter 200.

Meanwhile, where multiple images are to be facsimiled, multiple sets of image data are stored in the storage device of the sending-side FAX adapter 200 by repeating steps [U110], [D220].

Next, in step [U210], the user inputs the telephone number of the recipient (receiving side) by pressing the number keys disposed on the operation panel 212. When the user presses the send button on the operation panel 212 in step [U220], the sending-side FAX adapter 200 logically terminates the USB connection to the MFP 100. Specifically, the facsimile sending/receiving process execution unit 2000 switches the switch SW (FIG. 3) from the closed state to the open state. When the switch SW enters the open state, the MFP 100 recognizes that the sending-side FAX adapter 200 has been cut off.

In step [D240], the sending-side FAX adapter 200 initiates a SIP session with the receiving-side FAX adapter 400 and establishes a peer-to-peer communication path between the sending-side FAX adapter 200 and the receiving-side FAX adapter 400. In step [D250], the image data in the storage device of the sending-side FAX adapter 200 is transferred to the FAX adapter 400 via the established peer-to-peer communication path. The transferred image data is stored in the storage device of the receiving-side FAX adapter 400 in step [D250].

Where multiple image data are stored in the storage device of the sending-side FAX adapter 200, all of the multiple image data are transferred from the sending-side FAX adapter 200 to the receiving-side FAX adapter 400 by repeatedly executing the operations of (i) sending image data in step [D250] and (ii) storing the image data in the storage device of the receiving-side FAX adapter 400 in step [D410].

In the first embodiment, in order to ensure the reliability of data transfer, the transfer of image data between the sending-side FAX adapter 200 and the receiving-side FAX adapter 400 is carried out using the TCP protocol, which implements resend control. However, where the reliability of data transfer via the peer-to-peer communication path is sufficiently high, data transfer may be carried out using the UDP protocol, which does not implement resend control.

When the transfer of image data between the sending-side FAX adapter 200 and the receiving-side FAX adapter 400 is completed, the sending-side FAX adapter 200 terminates the SIP session in step [D260].

In step [D270], the sending-side FAX adapter 200 deletes the image data stored in the storage device of the sending-side FAX adapter 200. Upon the deletion of the image data in step [D270], facsimile sending process is completed. When this facsimile sending process is completed, the operation mode of the sending-side FAX adapter 200 transits from the facsimile sending mode M3 (FIG. 5) to the standby mode M2 (FIG. 5).

In the facsimile sending sequence of FIG. 7, the data stored in the storage device was deleted while the USB connection between the MFP 100 and sending-side FAX adapter 200 is cut off. It is also acceptable that the data stored in the storage device is deleted while a USB connection exists. In this case, the transfer of image data from the MFP 100 to the sending-side FAX adapter 200 can be carried out in parallel with the transfer of image data from the sending-side FAX adapter 200 to the receiving-side FAX adapter 400. In consequence, the capacity of the storage device of the sending-side FAX adapter 200 can be reduced by the sending-side FAX adapter 200 deleting the transmitted part of the image data stored in its storage device. However, when data stored in the storage device of the sending-side FAX adapter 200 is deleted while the sending-side FAX adapter 200 is in the USB-connected state, there is a risk that the file management tasks performed by the direct processing execution unit 1000 of the MFP 100 will be hindered. Consequently, it is preferred that deletion of data stored in the storage device of the sending-side FAX adapter 200 is carried out while a USB connection does not exist.

Figure 8:
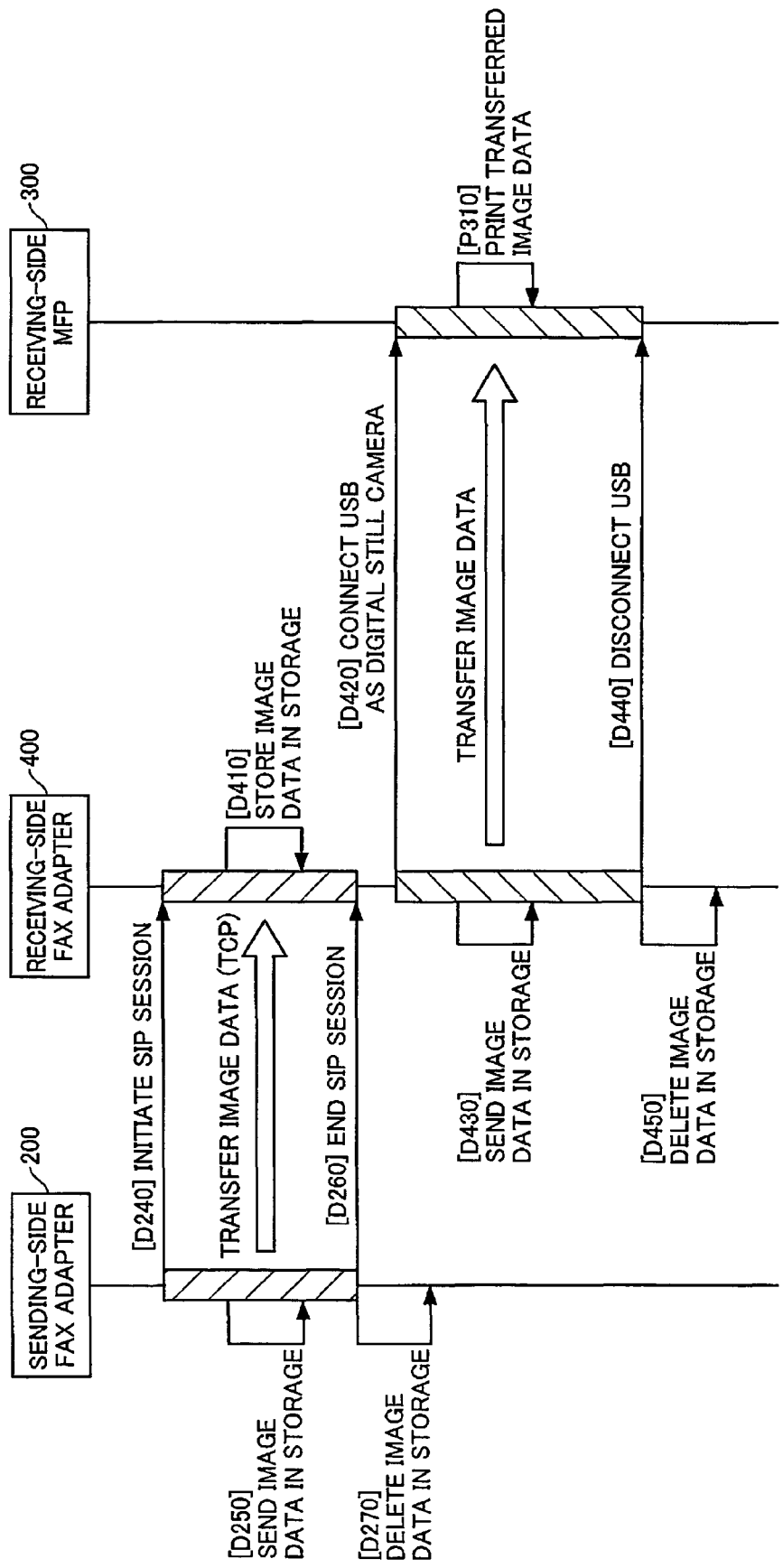
FIG. 8 is a sequence diagram showing the facsimile receiving sequence in the facsimile receiving mode M4.

FIG. 8 is a sequence diagram showing the facsimile receiving sequence in the facsimile receiving mode M4 (FIG. 5). The sequence diagram of FIG. 8 shows the case where facsimile reception from the sending-side FAX adapter 200 is carried out by the receiving-side FAX adapter 400 and the receiving-side MFP 300. The sequence in which data is transferred from the sending-side FAX adapter 200 to the receiving-side FAX adapter 400 in steps [D240]-[D270] is identical to the corresponding sequence shown in FIG. 7.

In step [D420], the receiving-side FAX adapter 400 connects the receiving-side FAX adapter 400 to the MFP 300 as a digital still camera that can print image data stored in the storage device without operation of the MFP 300 by the user. In this Specification, the function to print image data without operation of the MFP 300 is also termed a "direct printing function." The direct printing function may be achieved with execution of processes based on standards such as "PictBridge" (a standard developed by the Camera and Imaging Products Association) or "USB Direct Print" by the facsimile sending/receiving process execution unit 2000.

Where the direct printing function is implemented by PictBridge, the receiving-side FAX adapter 400 is connected to the MFP 300 as a Still Image Capture Device class (SICD-class) device. In this case, the file management tasks regarding the storage device of the receiving-side FAX adapter 400 are carried out by the receiving-side FAX adapter 400. Consequently, even where the receiving-side FAX adapter 400 and the MFP 300 are connected, the receiving-side FAX adapter 400 can store the image data received in step [D410] in the storage device thereof. As a result, the USB connection between the receiving-side FAX adapter 400 and the MFP 300 can be switched to the connected state before transfer of the image data from the sending-side FAX adapter 200 to the receiving-side FAX adapter 400 is completed.

Where the direct printing function is implemented using USB Direct Print, on the other hand, the receiving-side FAX adapter 400 is connected to the MFP 300 as a mass storage-class device. In this case, the file management tasks performed regarding the storage device of the receiving-side FAX adapter 400 are carried out by the direct processing execution unit 1000 of the MFP 100 (FIG. 4). Consequently, where the receiving-side FAX adapter 400 and the MFP 300 are connected, the receiving-side FAX adapter 400 cannot store the image data received in step [D410] in the storage device thereof. As a result, switching of the connection state of the USB connection between the receiving-side FAX adapter 400 and the MFP 300 is performed after image data transfer from the sending-side FAX adapter 200 to the receiving-side FAX adapter 400 is completed.

In step [D430], the receiving-side FAX adapter 400 sends the image data stored in its storage device to the MFP 300 with the direct printing function. In step [P310], the MFP 300 prints the image data transferred via USB. The image represented by this image data is output to paper which is specified by setting of the MFP 300. However, where information regarding the size of the image is incorporated in the image data, the receiving-side FAX adapter 400 selects the paper suited to the image size incorporated in the image data and sends a message to output the image onto the selected paper to the MFP 300.

When printing of the image data by the MFP 300 in step [P310] is completed, the MFP 300 notifies the receiving-side FAX adapter 400 that image output has been completed. Specifically, the MFP 300 sends information indicating that output has been completed (output completion information) to the receiving-side FAX adapter 400. Upon receiving this output completion information, the receiving-side FAX adapter 400 determines whether or not image data output has been completed. The receiving-side FAX adapter 400 can determine whether or not output has been completed using a different method as well. For example, it is acceptable that the receiving-side FAX adapter 400 determines completion of the output where no message from the MFP 300 is received for a prescribed period after the transmission of the image data in step [D430].

Where multiple image data are stored in the storage device of the receiving-side FAX adapter 400, the printing of all image data is carried out by repeatedly executing the image data transfer of step [D430] and the printing of step [P310].

Once the printing of step [P310] has ended, the receiving-side FAX adapter 400 cuts off the USB connection to the MFP 300 in step [D440] in the same manner as in step [D230] (FIG. 7). After the USB connection is cut off in step [D440], the receiving-side FAX adapter 400 deletes the image data in the storage device of the receiving-side FAX adapter 400, whereupon facsimile reception ends. Once facsimile reception is completed, the operation mode of the receiving-side FAX adapter 400 transits from the facsimile receiving mode M4 (FIG. 5) to the standby mode M2 (FIG. 5).

As described above, in the first embodiment, connecting of the FAX adapters 200, 400 as USB devices to the MFPs 100, 300 respectively, enables the sending-side MFP 100 to send image data to the receiving-side MFP 300 connected to the network and to make the receiving-side MFP 300 to print the image data. Consequently, facsimile transmission may be carried out over a network without changing the device configuration of the MFPs 100 and 300.

B. Second Embodiment

Figure 9:
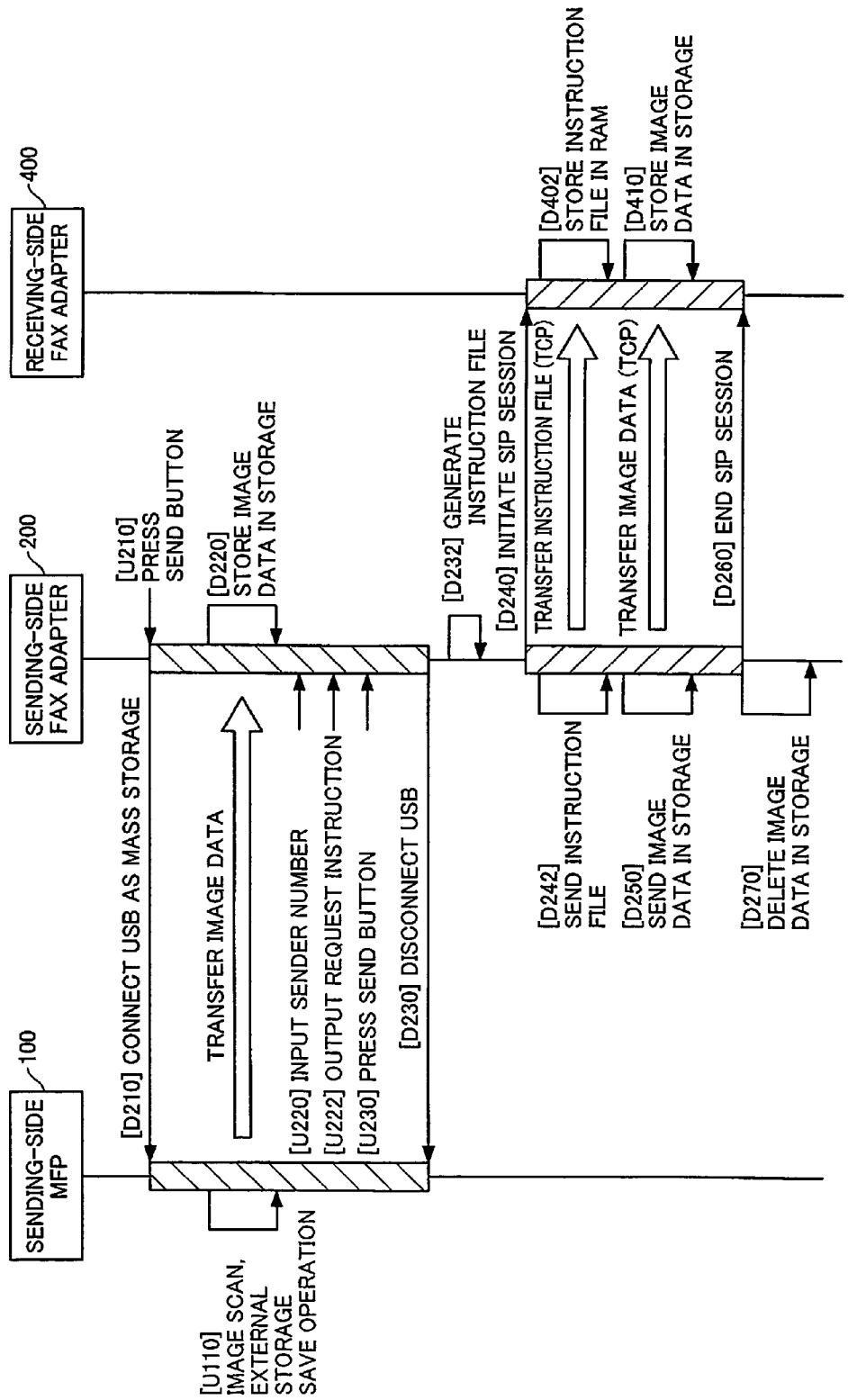
FIG. 9 is a sequence diagram showing the facsimile sending sequence in the second embodiment.

FIG. 9 is a sequence diagram showing the facsimile sending sequence in the second embodiment. The facsimile sending sequence of the second embodiment shown in FIG. 9 differs from the facsimile sending sequence of the first embodiment shown in FIG. 7 in that the four steps [U222], [D232], [D242] and [D402] are added and the instruction file transferring step [D242] is added.

In step [U222], the sending-side user inputs an output request instruction to the sending-side FAX adapter 200. Here, the output request instruction is instruction requesting either automatic printing in which printing of the image data received by the receiving side is performed automatically, or selective printing in which printing of the image data received by the receiving side is selected by the user.

In step [D232], the sending-side FAX adapter 200 generates, based on the output request instruction input in step [U222], an instruction file indicating whether automatic printing or selective printing is to be requested.

In step [D242], the sending-side FAX adapter 200 sends the instruction file to the receiving-side FAX adapter 400. In step [D402], the receiving-side FAX adapter 400 stores the transferred instruction file in the RAM 204 (FIG. 2).

In the second embodiment, after the transference of the image data in step [D250], the sending-side FAX adapter 200 deletes both of the image data and the instruction file stored in the storage device of the FAX adapter 200.

Figure 10:
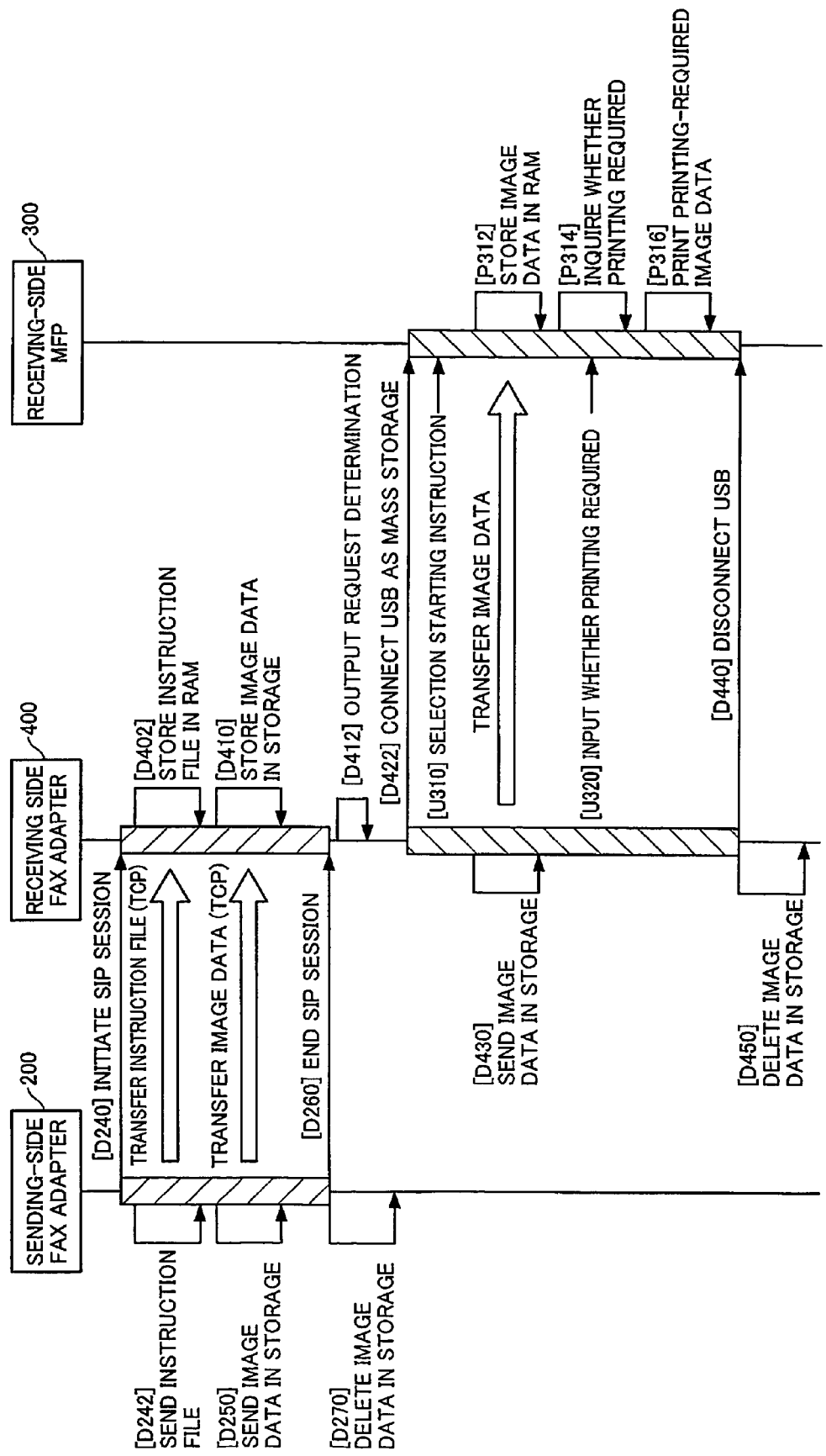
FIG. 10 is a sequence diagram showing the facsimile receiving sequence in the second embodiment.

FIG. 10 is a sequence diagram showing the facsimile receiving sequence in the second embodiment. The facsimile receiving sequence of the second embodiment shown in FIG. 10 differs from the facsimile receiving sequence of the first embodiment shown in FIG. 8 in that the five steps of [D242], [D402], [D412], [U310] and [U320] are added, step [D420] is replaced by step [D422], and step [P310] is replaced by steps [P312]-[P316]. In other respects, the sequence is identical to the corresponding sequence of the first embodiment. The sequence by which image data is sent from the sending-side FAX adapter 200 to the receiving-side FAX adapter 400 in steps [D240]-[D270] is identical to the corresponding sequence in FIG. 9.

In step [D412], the receiving-side FAX adapter 400 analyzes the instruction file stored in the RAM 204 in step [D402], determines whether the sending-side user has requested automatic printing or selective printing, and executes either automatic printing or selective printing in accordance with the request. In the example of FIG. 10, a situation in which the user has requested selective printing and selective printing is being executed is shown. The sequence of operations performed during automatic printing is identical to the steps [D420]-[D450] of the sequence of operations shown in the first embodiment.

In step [D422], the receiving-side FAX adapter 400 connects to the MFP 300 as a mass storage device. In step [U310], the user inputs to the MFP 300 a selection starting instruction for starting selection of the image data to be printed.

In step [P312], the MFP 300 stores the image data transferred from the receiving-side FAX adapter 400 in the RAM 104 (FIG. 2). In step [P314], the image data stored in the RAM 104 in step [P312] is displayed on the viewer 162 (FIG. 2) together with an inquiry regarding whether printing is required. In step [U310], based on the display on the viewer 162, the user inputs an instruction to the MFP 300 that indicates whether or not printing is required. In step [U316], printing of the image data as to which a printing required instruction was issued by the user in step [U320] is carried out.

Where multiple image data are stored in the storage device of the receiving-side FAX adapter 400, printing of all image data for which printing is deemed required is executed by repeatedly executing the steps between and including image data transfer (step [D430]) and printing (step [P316]).

In the second embodiment, after the printing of the image data in step [P316], the receiving-side FAX adapter 400 deletes both of the image data and the instruction file stored in the storage device of the FAX adapter 400.

In the second embodiment allows the receiving-side user to select image data which is necessary for the user, and printing of only the selected image data to be executed. As a result, consumption of consumables such as ink, toner and paper due to the unnecessary printing of image data can be minimized. Furthermore, because the sending-side user can request automatic printing where necessary, the image data regarding which receiving-side output is required can be output from the receiving-side MFP.

The second embodiment is preferable to the first embodiment in that it minimizes the consumption of consumables, as described above. On the other hand, the first embodiment is preferable to the second embodiment in that the configurations of the sending-side FAX adapter 200 and the receiving-side FAX adapter 400 can be simpler.

In the second embodiment, in step [D412] of FIG. 10, which of the automatic printing mode or the selective printing mode is to be executed is determined based on the issuance of an output request instruction from the sending-side user. It is also acceptable that a different determination method is used to determine the printing mode to be executed. For example, the receiving-side FAX adapter 400 may determine the printing mode to be executed based on information pertaining to the sending side ("sender information"), such as connection information or other information regarding the sending-side FAX adapter 200. Specifically, where the receiving-side user establishes in advance "automatic printing senders" for whom automatic printing is to be executed and the sender specified by the sender information is an automatic printing sender, automatic printing can be executed regardless of the output request instruction contained in the instruction file. Similarly, the receiving-side FAX adapter 400 can determine the printing mode based on only the sender information. In this case, the processes in the sequence chart of FIG. 9 involving the obtaining of the output request instruction (step [D220]), generation of an instruction file (step [D232]) and transfer of the instruction file (steps [D242], [D402]), which are performed by the sending-side FAX adapter 200, can be omitted.

C. Variations

The present invention is not limited to the above examples and embodiments, and may be implemented in various forms within the essential scope thereof. For example, the present invention may be implemented according to the variations described below.

C1. Variation 1

In the embodiments hereinabove, scan image data generated from an image scanned by the user on the sending-side MFP 100 is transferred from the sending-side MFP 100 to the sending-side FAX adapter 200. It is also acceptable to transfer image data other than the scan image data. The image data transferred from the sending-side MFP 100 to the sending-side FAX adapter 200 may comprise image data stored in the memory card slot 142 of the sending-side MFP 100, for example.

C2. Variation 2

In the embodiments hereinabove, the MFP and the associated FAX adapter are connected via USB. For the connection between the MFP and the FAX adapter, a physical interface other than USB may be used. Such an alternative configuration is acceptable so long as the logical connection between the MFP and the FAX adapter can be switched between the connected state and the disconnected state. The physical interface used to connect the MFP and the FAX adapter may comprise an interface governed by the IEEE 1394 standard, for example.

C3. Variation 3

In the embodiments hereinabove, a SIP system that utilizes peer-to-peer communication is employed for the communication between the two FAX adapters 200, 400 (FIG. 1). In general, any desired communication system may be used so long as it is capable of so-called "push-type" data transfer in which the receiving-side FAX adapter 400 receives data based on data transmission from the sending-side FAX adapter 200. In this case, the calling from the sending-side FAX adapter 200 and the sequence of operations performed in order to establish a communication path, such as the operation of obtaining connection information regarding the receiving-side FAX adapter 400, may be changed in accordance with the communication system used.

C4. Variation 4

The FAX adapter of the above embodiments included only facsimile sending and receiving functions, but a voice calling function may be added. In this case, a call button for making a voice call and a receiver are incorporated in the FAX adapter. Where a voice call is made from the sending side, a call request is issued by the user pressing the call button. On the other hand, because the receiving-side FAX adapter 400 can determine from the media negotiation described above whether the call request is for a voice call or a facsimile transmission, the receiving-side FAX adapter 400 can switch appropriately between the processing required for facsimile transmission and the processing required for a voice call based on the call request.

C5. Variation 5

In the embodiments hereinabove, the FAX adapter includes both a facsimile sending function and a facsimile receiving function. It is also acceptable that the FAX adapter includes only one of these functions. In this case, facsimile transmission can be carried out even if the FAX adapter is connected to a device other than an MFP. For example, where the FAX adapter includes only a facsimile receiving function, the FAX adapter can be connected to a printer that does not have scanner or copier functions. On the other hand, if the FAX adapter includes only a facsimile sending function, the FAX adapter may be connected to a scanner that does not have a printer function. Furthermore, while the FAX adapter of the above embodiments is configured separately from the MFP, the two devices may be integrally formed as a single unit.

C6. Variation 6

In the embodiments hereinabove, the facsimile transmission of the present invention is performed between FAX adaptors. It is also available to perform the facsimile transmission when either of a sending side device and a receiving side device is the FAX adaptor. For example, the facsimile transmission is available between a FAX adaptor and a personal computer, where the personal computer is configured to be able to peer-to-peer transmission of data.

In Addition, it is also available to perform the facsimile transmission by audio data transmission such as G3 mode FAX transmission, where the conversion between an IP telephone network and a conventional telephone wire network is provided. In this case, the sending side FAX adaptor 200 converts the image data received from the MFP 100 in a manner as described above to the audio data for the G3 mode FAX transmission. By transmitting the converted audio data from the IP telephone network to the conventional telephone wire network, the facsimile transmission from the FAX adaptor 200 to an apparatus for transmitting G3 mode FAX data (hereinafter, such an apparatus is also called "G3FAX") is performed. On the other hand, the receiving side FAX adaptor 400 generates an image data printable in the MFP 300 (an image data in JPEC format etc.) from audio data transmitted from the conventional telephone wire network to the IP telephone network. By transferring the generated image data to the MFP 300 as described above, the facsimile transmission from G3FAX to the FAX adaptor 400 is performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device for receiving an image over a network comprising:

an image data storage unit configured to store image data representing an image received over the network; and an output device connection unit configured to connect the facsimile device to an external image output device for outputting the image according to the image data supplied from the facsimile device, wherein the facsimile device is configured:

to perform file manipulation of the image data storage unit in response to a file manipulation instruction supplied from the image output device; and to restrict the reception of the file manipulation instruction during the facsimile device is receiving an image data over the network, and wherein the output device connection unit is configured to be able to switch logical connection of the facsimile device to the image output device between a connected state and a disconnected state, the file manipulation instruction is supplied from the image output device via the logical connection in the connected state, and the facsimile device is configured:

to receive an image data over the network when the logical connection is in the disconnected state;

to switch the logical connection to the connected state after the image data is received;

to transfer the image data stored in the image data storage unit to the image output device in response to the file manipulation instruction; and to switch the logical connection to the disconnected state after the image data is transferred.

2. A facsimile device according to claim 1, wherein the image data stored in the image data storage unit is deleted after the logical connection is switched to the disconnected state.

3. A facsimile device according to claim 1, wherein the logical connection is switched to the disconnected state after notification of output completion is obtained from the image output device.

4. A facsimile device according to claim 1, wherein where the logical connection is in the connected state, the facsimile device causes the image output device to recognize the facsimile device as a device that can cause the image output device to output the image according to the stored image data without user's operations of the image output device.

5. A facsimile device according to claim 1, wherein where the logical connection is in the connected state, the facsimile device functions as an digital still camera configured to transfer an image data to the image output device with direct printing protocol.

6. A facsimile device for transmitting an image over a network comprising:

a sending instruction obtaining unit configured to obtain from a user a sending instruction of sending the image by the facsimile device;

an image data storage unit configured to store image data representing the image;

an image data sending unit configured to send the image data stored in the image data storage unit over the network; and an input device connection unit configured to connect the facsimile device to an external image input device for providing image data to the facsimile device, wherein the facsimile device is configured:

to perform file manipulation of the image data storage unit in response to a file manipulation instruction supplied from the image input device;

to store an image data transferred from the image input device to the image data storage unit in response to the file manipulation instruction; and to restrict the reception of the file manipulation instruction during deletion of the image data stored in the image data storage unit, and wherein the input device connection unit is configured to be able to switch logical connection of the facsimile device to the image input device between a connected state and a disconnected state, the file manipulation instruction is supplied from the image input device via the logical connection in the connected state, and the facsimile device is configured:

to switch the logical connection to the connected state after the sending instruction is obtained by the sending instruction obtaining unit;

to store an image data transferred from the image input device to the image data storage unit in response to the file manipulation instruction;

to switch the logical connection to the disconnected state after the image data is transferred over the network; and to delete the image data stored in the image data storage unit after the logical connection is switched to the disconnected state.

7. A facsimile device according to claim 6, wherein the image data stored in the image data storage unit is sent over the network after the logical connection is switched to the disconnected state, and the image data stored in the image data storage unit is deleted after the sending of the image data is completed.

8. A facsimile device according to claim 6, wherein where the logical connection is in the connected state, the facsimile device causes the image input device to recognize the facsimile device as a storage device that stores data supplied from the image input device.

9. A facsimile device for transmitting an image over a network comprising:

an image data storage unit configured to store image data representing an image;

an input/output device connection unit configured to control logical connection of the facsimile device to an external image input/output device for providing image data to the facsimile device and for outputting the image according to the image data supplied from the facsimile device;

a facsimile sending unit configured to execute facsimile sending of the image;

a facsimile receiving unit configured to execute a facsimile reception of the image; and a sending instruction obtaining unit configured to obtain from a user a sending instruction of sending the image by the facsimile sending unit, wherein the input/output device connection unit is configured to be able to switch the logical connection to the image input/output device between a connected state and a disconnected state, the facsimile sending unit has an image data sending unit configured to send the image data stored in the image data storage unit over the network, the facsimile sending unit is configured:
  to connect the facsimile device to the input/output device as a mass storage device by switching the logical connection to the connected state after the sending instruction is obtained by the instruction obtaining unit;
  to store an image data transferred from the image input/output device into the image data storage unit under control of the image input/output device the logical connection to which is in the connected state; and
  to switch the logical connection to the disconnected state after the image data is transferred from the image input/output device, the facsimile receiving unit has an image data receiving unit configured to store an image data received over the network into the image data storage unit, and the facsimile receiving unit is configured:
  to connect the facsimile device to the input/output device as a still image capturing device by switching the logical connection to the connected state after commencement of receiving the image data over the network;
  to transfer the image data stored in the image data storage unit to the image input/output device under control of the image input/output device the logical connection to which is in the connected state; and
  to switch the logical connection to the disconnected state after the image data is transferred to the image input/output device.

10. The facsimile device according to claim 9, wherein during the logical connection between the facsimile device and the image input/output device is in the connected state, file management of the image data storage unit in the facsimile device is performed by the image input/output device, and the image data stored in the image data storage unit is deleted after the logical connection is switched to the disconnected state.

11. The facsimile device according to claim 9, wherein during the logical connection between the facsimile device and the image input/output device is in the connected state, file management of the image data storage unit in the facsimile device is performed by the image input/output device, and where the logical connection is in the connected state, the image input/output device issues an instruction to delete the image data stored in the image data storage unit.

12. A controlling method of a facsimile device for receiving an image over a network, the facsimile device having:
  an image data storage unit configured to store image data representing an image received over the network; and
  an output device connection unit configured to connect the facsimile device to an external image output device for outputting the image according to the image data supplied from the facsimile device, the controlling method comprising the steps of:
  performing file manipulation of the image data storage unit in response to a file manipulation instruction supplied from the image output device; and
  restricting the reception of the file manipulation instruction during the facsimile device is receiving an image data over the network, wherein the output device connection unit is configured to be able to switch logical connection of the facsimile device to the image output device between a connected state and a disconnected state, the file manipulation instruction is supplied from the image output device via the logical connection in the connected state, and the controlling method includes the steps of
  receiving an image data over the network when the logical connection is in the disconnected state;
  switching the logical connection to the connected state after the image data is received;
  transferring the image data stored in the image data storage unit to the image output device in response to the file manipulation instruction; and
  switching the logical connection to the disconnected state after the image data is transferred.

13. A controlling method of a facsimile device for transmitting an image over a network, the facsimile device having:
  a sending instruction obtaining unit configured to obtain from a user a sending instruction of sending the image by the facsimile device;
  an image data storage unit configured to store image data representing the image; an image data sending unit configured to send the image data stored in the image data storage unit over the network; and
  an input device connection unit configured to connect the facsimile device to an external image input device for providing image data to the facsimile device, the controlling method comprising the steps of
  performing file manipulation of the image data storage unit in response to a file manipulation instruction supplied from the image input device;
  storing an image data transferred from the image input device to the image data storage unit in response to the file manipulation instruction; and
  restricting the reception of the file manipulation instruction during deletion of the image data stored in the image data storage unit wherein the input device connection unit is configured to be able to switch logical connection of the facsimile device to the image input device between a connected state and a disconnected state, the file manipulation instruction is supplied from the image input device via the logical connection in the connected state, and the controlling method includes the steps of
  switching the logical connection to the connected state after the sending instruction is obtained by the sending instruction obtaining unit;
  storing an image data transferred from the image input device to the image data storage unit in response to the file manipulation instruction;
  switching the logical connection to the disconnected state after the image data is transferred over the network; and
  deleting the image data stored in the image data storage unit after the logical connection is switched to the disconnected state.

14. A controlling method of a facsimile device for transmitting an image over a network,
  the facsimile device having:

an image data storage unit configured to store image data representing an image;

an input/output device connection unit configured to control logical connection of the facsimile device to an external image input/output device for providing image data to the facsimile device and for outputting the image according to the image data supplied from the facsimile device; and a sending instruction obtaining unit configured to obtain from a user a sending instruction of sending the image by the facsimile sending unit, wherein the input/output device connection unit is configured to be able to switch the logical connection to the image input/output device between a connected state and a disconnected state, the controlling method comprising the steps of:

(a) executing facsimile sending of the image by sending the image data stored in the image data storage unit over the network; and (b) executing a facsimile reception of the image by storing an image data received over the network into the image data storage unit, wherein the step (a) includes the steps of connecting the facsimile device to the input/output device as a mass storage device by switching the logical connection to the connected state after the sending instruction is obtained by the instruction obtaining unit;

storing an image data transferred from the image input/output device into the image data storage unit under control of the image input/output device the logical connection to which is in the connected state; and switching the logical connection to the disconnected state after the image data is transferred from the image input/output device, and the step (b) includes the steps of connecting the facsimile device to the input/output device as a still image capturing device by switching the logical connection to the connected state after commencement of receiving the image data over the network;

transferring the image data stored in the image data storage unit to the image input/output device under control of the image input/output device the logical connection to which is in the connected state; and switching the logical connection to the disconnected state after the image data is transferred to the image input/output device.

* * * * *